(12) United States Patent
Chen

(10) Patent No.: US 8,109,699 B2
(45) Date of Patent: Feb. 7, 2012

(54) BORING BIT

(76) Inventor: Chin-Chiu Chen, Taichung Hsien (TW)

( * ) Notice: Subject to any disclaimer, the term of this patent is extended or adjusted under 35 U.S.C. 154(b) by 409 days.

(21) Appl. No.: 12/502,056

(22) Filed: Jul. 13, 2009

(65) Prior Publication Data

US 2011/0008115 A1 Jan. 13, 2011

(51) Int. Cl.
*B23B 51/00* (2006.01)
*B23C 5/22* (2006.01)

(52) U.S. Cl. ............... 407/46; 407/101; 407/103

(58) Field of Classification Search .......... 407/46, 407/48, 40, 33, 22, 101, 103
See application file for complete search history.

(56) References Cited

U.S. PATENT DOCUMENTS

| | | | | | |
|---|---|---|---|---|---|
| 1,850,358 A | * | 3/1932 | Scott | ................ | 175/336 |
| 2,310,992 A | * | 2/1943 | Proksa | ................ | 408/197 |
| 3,250,154 A | * | 5/1966 | Breuning | ................ | 408/199 |
| 3,309,945 A | * | 3/1967 | Halpern | ................ | 408/83 |
| 3,323,193 A | * | 6/1967 | Greenleaf | ................ | 407/86 |
| 3,755,868 A | * | 9/1973 | LaForge et al. | ................ | 407/75 |
| 4,303,358 A | * | 12/1981 | Grusa | ................ | 408/223 |
| 7,163,360 B2 | * | 1/2007 | Toyose | ................ | 407/36 |
| 2011/0008115 A1 | * | 1/2011 | Chen | ................ | 407/46 |

* cited by examiner

*Primary Examiner* — Will Fridie, Jr.
(74) *Attorney, Agent, or Firm* — patenttm.us

(57) ABSTRACT

A boring bit has a head, a blade assembly and a blade. The head has a mounting recess and two holding protrusions. The mounting recess is formed in the head and has a restricting surface and a threaded hole. The holding protrusions are formed on the restricting surface and each has two oblique restricting faces. The blade assembly is attached to the head and has a mounting base. The mounting base is mounted in the mounting recess and has an inner surface, a through hole and a guiding channel. The inner surface abuts with the restricting surface. The through hole is formed through the mounting base and aligns with the threaded hole. The guiding channel is formed in the mounting base, is mounted around the holding protrusions and has two abutting surfaces abutting the oblique restricting faces of the holding protrusions. The blade is detachably mounted on the blade assembly.

4 Claims, 6 Drawing Sheets

BORING BIT

BACKGROUND OF THE INVENTION

1. Field of the Invention

The present invention relates to a boring bit for use with a drill, and more particularly to a boring bit having a well-secured blade.

2. Description of Related Art

With reference to FIGS. 5 and 6, a conventional boring bit comprises a head (40) and a blade assembly (43). The head (40) has a top, an external surface, a mounting recess (41) and two holding protrusions (42). The mounting recess (41) is formed on the external surface of the head (40) near the top and has a bottom and a threaded hole (not numbered). The threaded hole is formed in the bottom of the mounting recess (41). The holding protrusions (42) are formed on and protrude from the bottom of the mounting recess (41) beside the threaded hole.

The blade assembly (43) is detachably attached to the head (40) and has a bottom, a top, a mounting base (44), a fastener and a blade (46). The mounting base (44) is formed on the bottom of the blade assembly (43) and is detachably mounted in the mounting recess (41) of the head (40) and has an inner side, a through hole and a guiding channel (45). The through hole is formed through the mounting base (44) and aligns with the threaded hole of the mounting recess (41). The guiding channel (45) is laterally formed through the inner side of the mounting base (44), communicates with the through hole of the mounting base (44) and is mounted around the holding protrusions (42) of the head (40). The fastener is mounted in the through hole of the mounting base (44), is screwed with the threaded hole of the mounting recess (41) to connect the blade assembly (43) with the head (40). The blade (46) is detachably mounted on the top of the blade assembly (43).

Although the blade (46) can be changed, a contacting area between the holding protrusion (42) of the head (40) and the guiding channel (45) of the blade assembly (43) is small, so the conventional boring bit is not secured strongly enough to resist heaving loading so use of the conventional boring bit is limited.

To overcome the shortcomings, the present invention tends to provide a boring bit to mitigate or obviate the aforementioned problems.

SUMMARY OF THE INVENTION

The main objective of the invention is to provide an adjustable boring bit having a well secured blade.

The boring bit in accordance with the present invention has a head, a blade assembly and a blade. The head has a mounting recess and two holding protrusions. The mounting recess is formed on the head and has a vertical restricting surface and a threaded hole. The holding protrusions are formed on and protrude from the vertical restricting surface beside the threaded hole and each holding protrusion has two oblique restricting faces. The blade assembly is detachably attached to the head and has a mounting base and a fastener. The mounting base is formed on the blade assembly, is detachably mounted in the mounting recess and has an inner surface, a through hole and a guiding channel. The inner surface of the mounting base abuts the vertical restricting surface of the mounting recess. The through hole is formed through the mounting base and aligns with the threaded hole. The guiding channel is laterally formed in the inner surface of the mounting base, communicates with the through hole and is mounted around the holding protrusions and has two abutting surfaces respectively abutting the oblique restricting faces of the holding protrusions. The fastener is mounted in the through hole of the mounting base and is screwed with the threaded hole of the mounting recess to connect the blade assembly to the head. The blade is detachably mounted on the top of the blade assembly.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
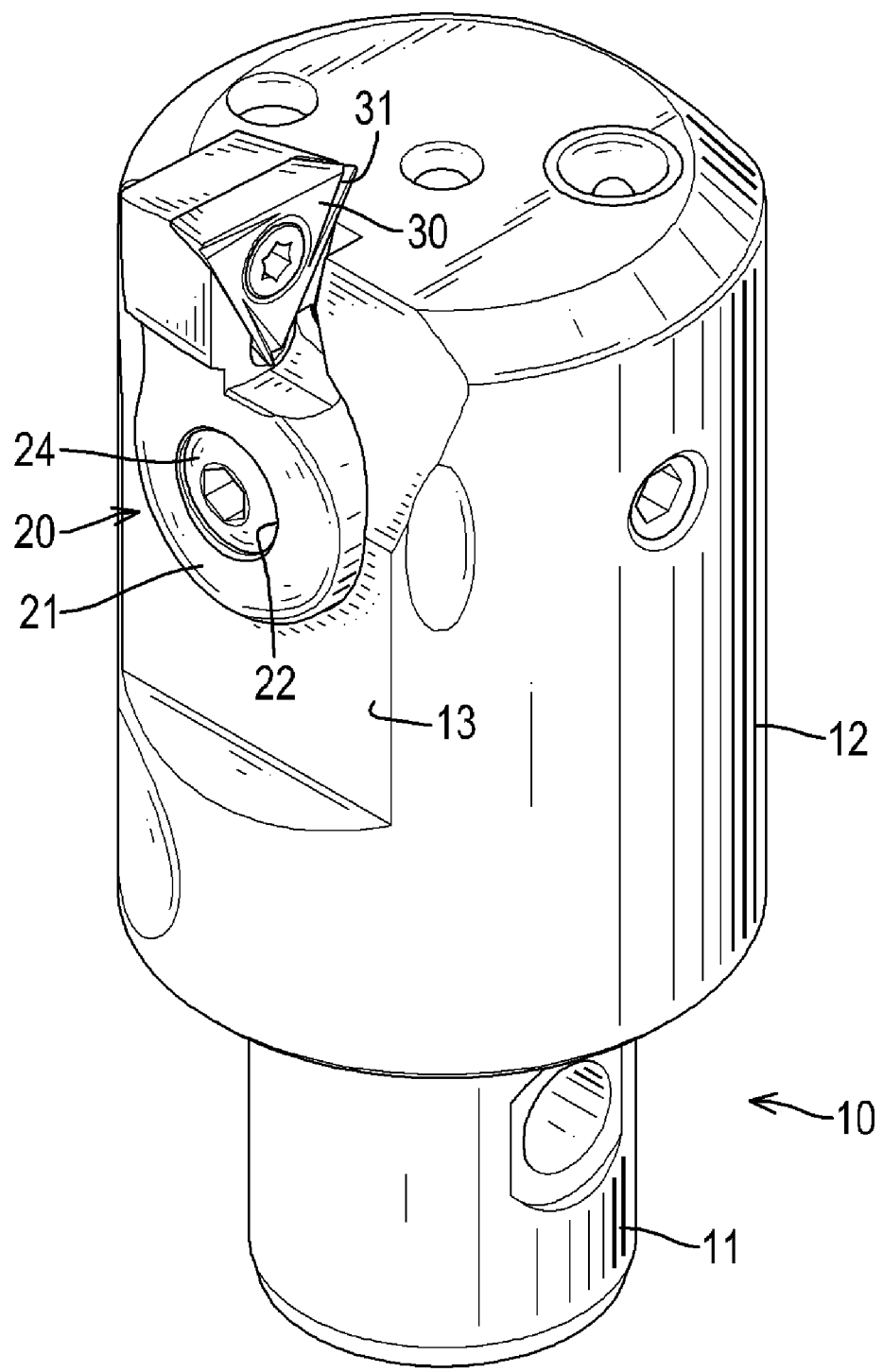
FIG. 1 is a perspective view of a boring bit in accordance with the present invention.

With reference to FIGS. 1 to 4, a boring bit in accordance with the present invention comprises a head (10), a blade assembly (20) and a blade (30).

The head (10) has a bottom, a top, a connecting stub (11), an external surface (12), a mounting recess (14) and two holding protrusions (17).

The connecting stub (11) is formed on the bottom of the head (10) and has a top.

The external surface (12) is formed on the top of the connecting stub (11) and has a mounting segment (13). The mounting segment (13) is formed on the external surface (12).

The mounting recess (14) is formed in the head (10) near the top, may be circular and formed in the mounting segment (13) of the external surface (12) and has a bottom, a vertical restricting surface (15) and a threaded hole (16). The vertical restricting surface (15) is formed on the bottom of the mounting recess (14) and has a center. The threaded hole (16) is formed through the center of the vertical restricting surface (15).

The holding protrusions (17) are formed on and protrude from the vertical restricting surface (15) of the mounting recess (14) beside the threaded hole (16) and each holding protrusion (17) has an upper edge, a lower edge and two oblique restricting faces (171). The oblique restricting faces (171) are respectively and aslant formed on the upper edge and the lower edge of the holding protrusion (17).

The blade assembly (20) is detachably attached to the head (10) and has a bottom, a top, a mounting base (21) and a fastener (24).

The mounting base (21) may have a shape corresponding to the mounting recess (14) of the head (10), is formed on the bottom of the blade assembly (20) and is detachably mounted in the mounting recess (14) of the head (10) and has an inner surface, a through hole (22) and a guiding channel (23). The inner surface of the mounting base (21) is a flat surface, is mounted in the mounting recess (14) of the head (10) and abuts with the vertical restricting surface (15) of the mounting recess (14). The through hole (22) is formed through the mounting base (21) and aligns with the threaded hole (16) of the mounting recess (14). The guiding channel (23) is laterally formed in the inner surface of the mounting base (21), communicates with the through hole (22) of the mounting base (21) and is mounted around the holding protrusions (17) of the head (10) and has a top inner side, a bottom inner side and two abutting surfaces (231). The abutting surfaces (231) are respectively and aslant formed on the inner sides of the guiding channel (23) and respectively abut with the oblique restricting faces (171) of the holding protrusions (17) to hold the blade assembly securely with the head (10).

The fastener (24) is mounted in the through hole (22) of the mounting base (21) and is screwed with the threaded hole (16) of the mounting recess (14) to connect the blade assembly (20) with the head (10).

The blade (30) is triangular, is detachably mounted on the top of the blade assembly (20) and has three corners and three cutting edges (31). The cutting edges (31) are respectively formed on the corners of the blade (30).

Figure 2:
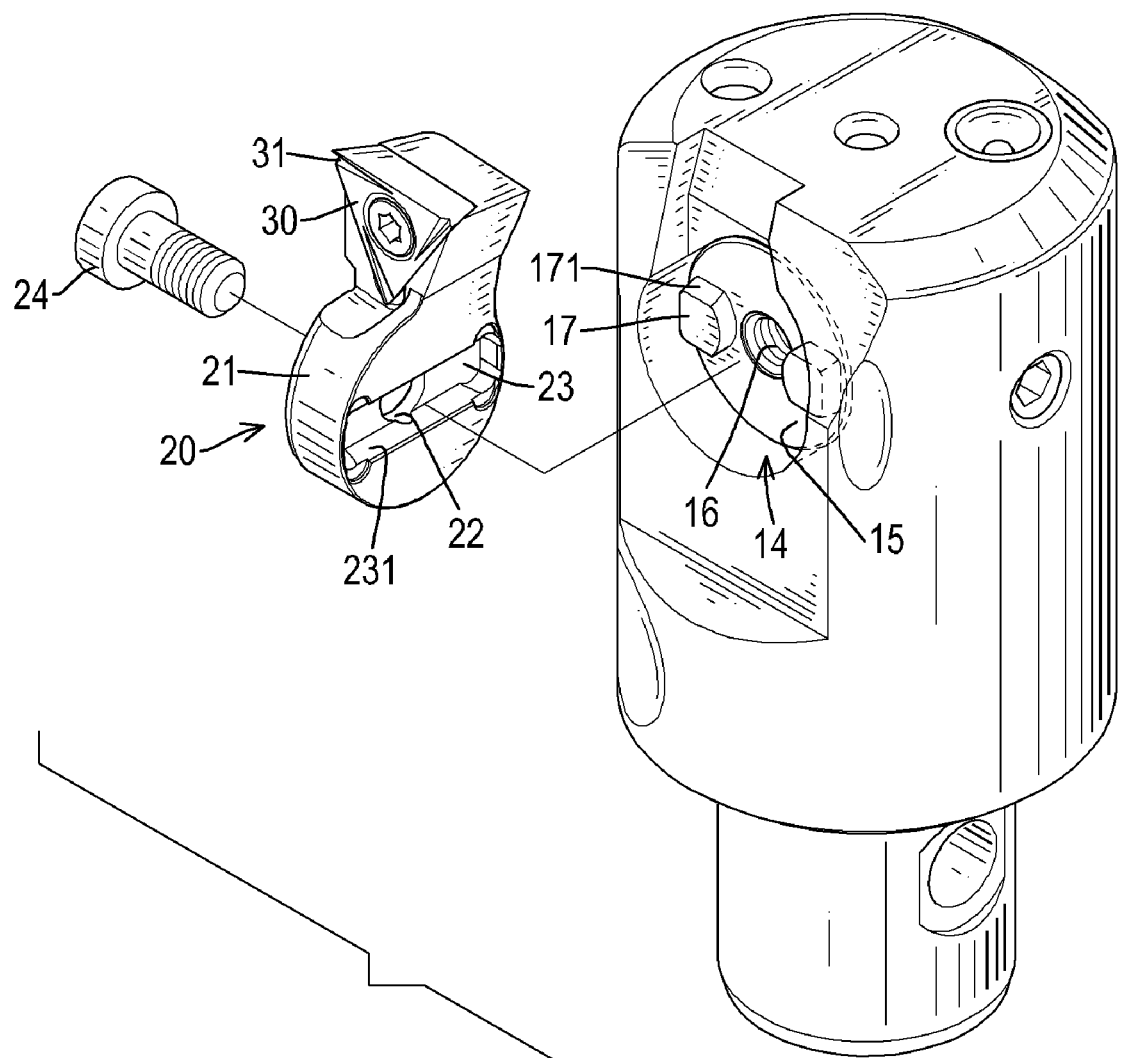
FIG. 2 is an exploded perspective view of the boring bit in FIG. 1.
Figure 3:
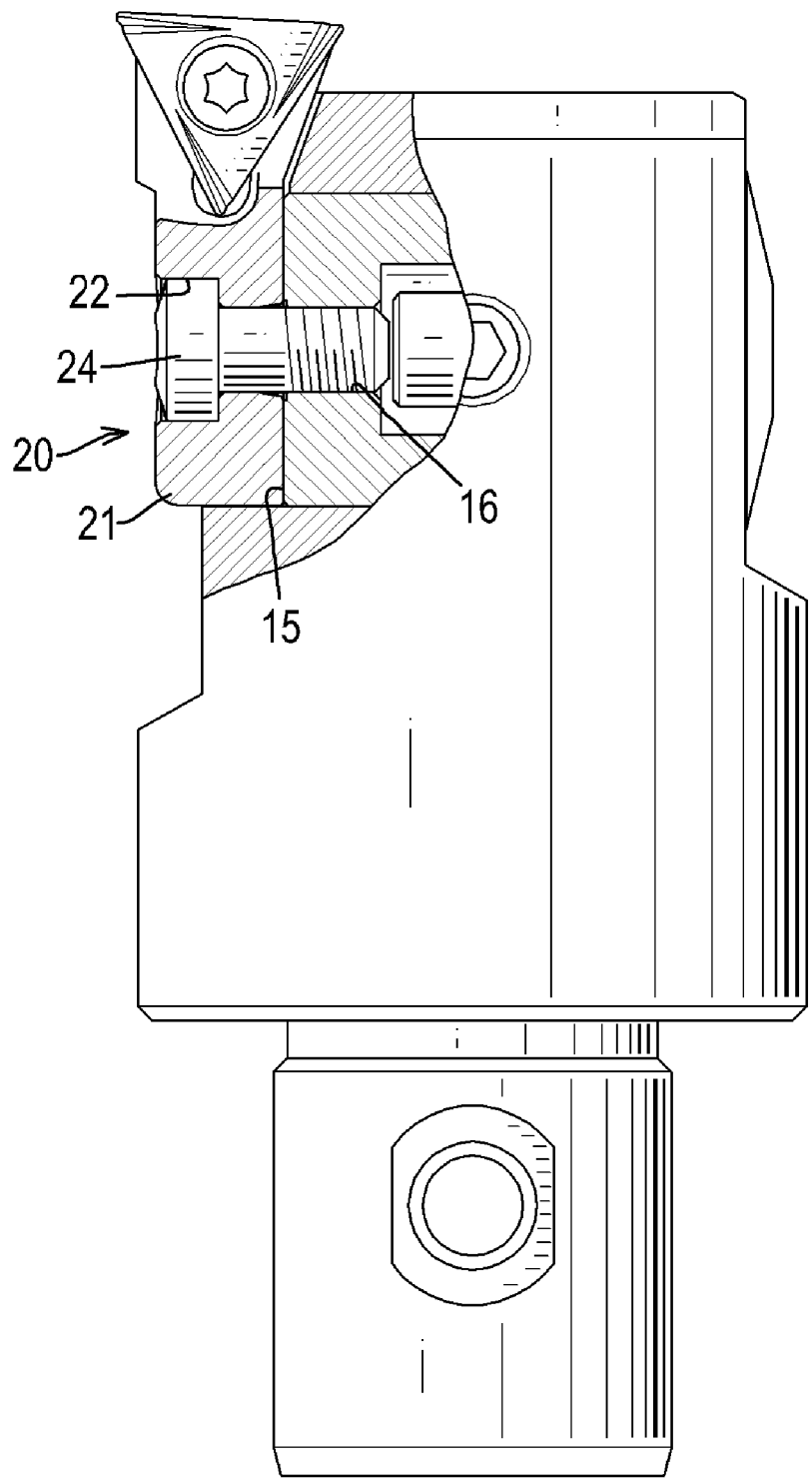
FIG. 3 is a side view in partial section of the boring bit in FIG. 1.
Figure 4:
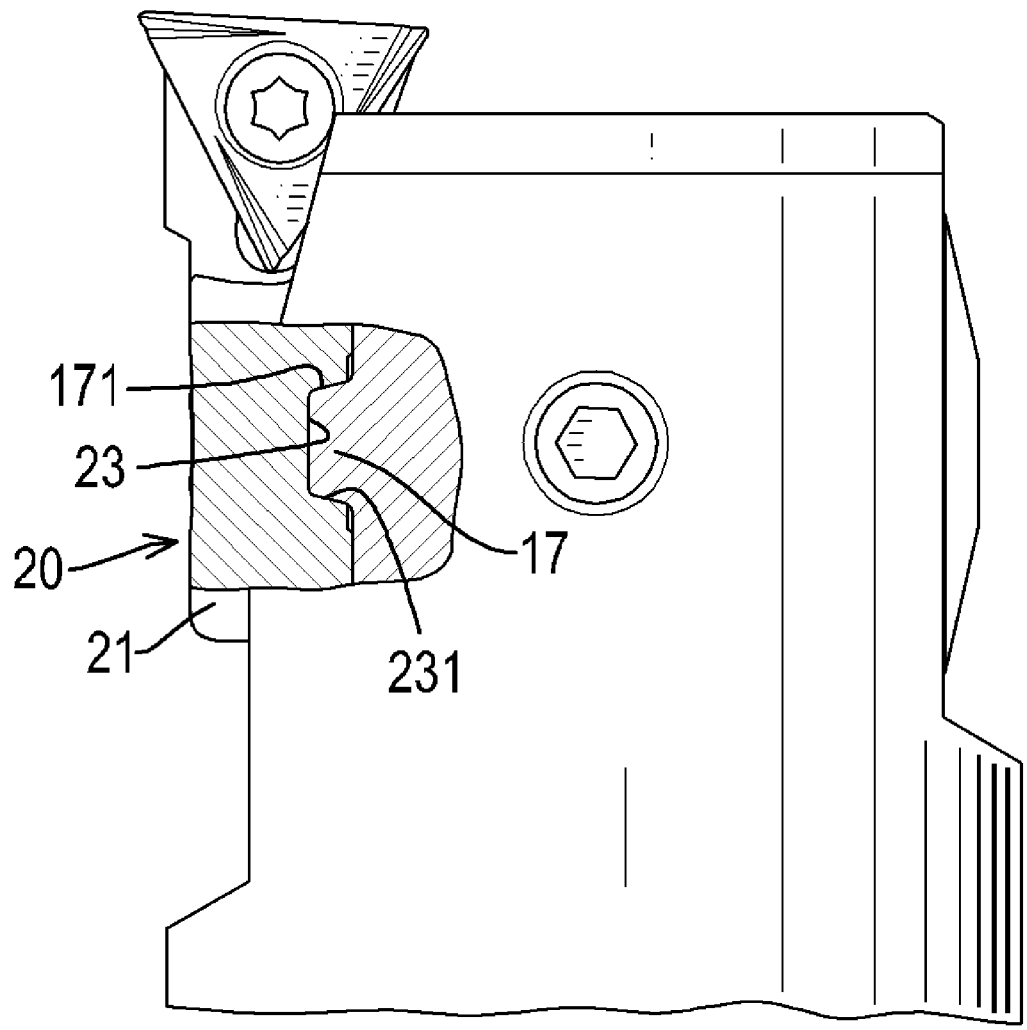
FIG. 4 is an enlarged side view in partial section of the boring bit in FIG. 3.
Figure 5:
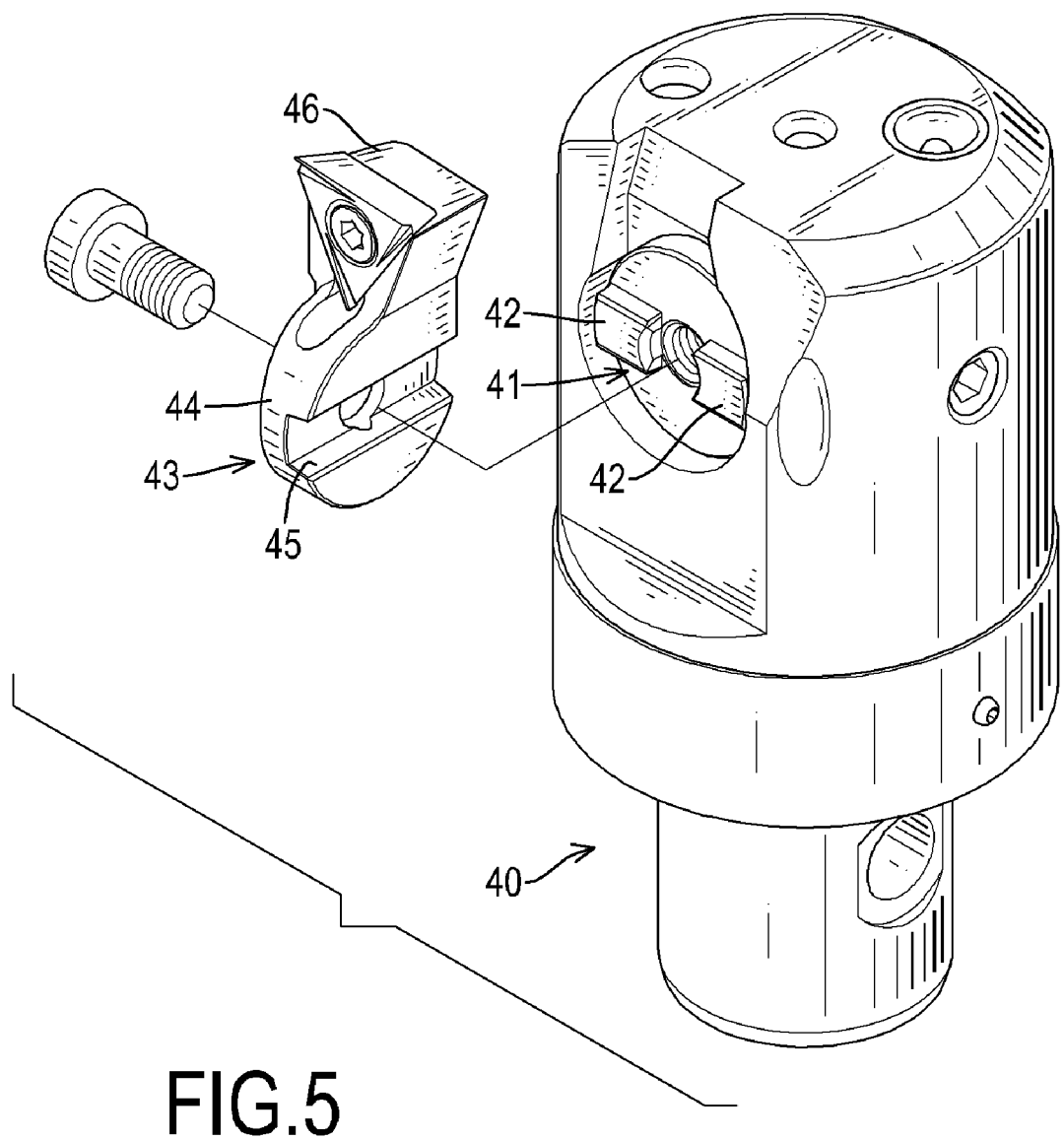
FIG. 5 is a perspective view of a boring bit in accordance with the prior art.
Figure 6:
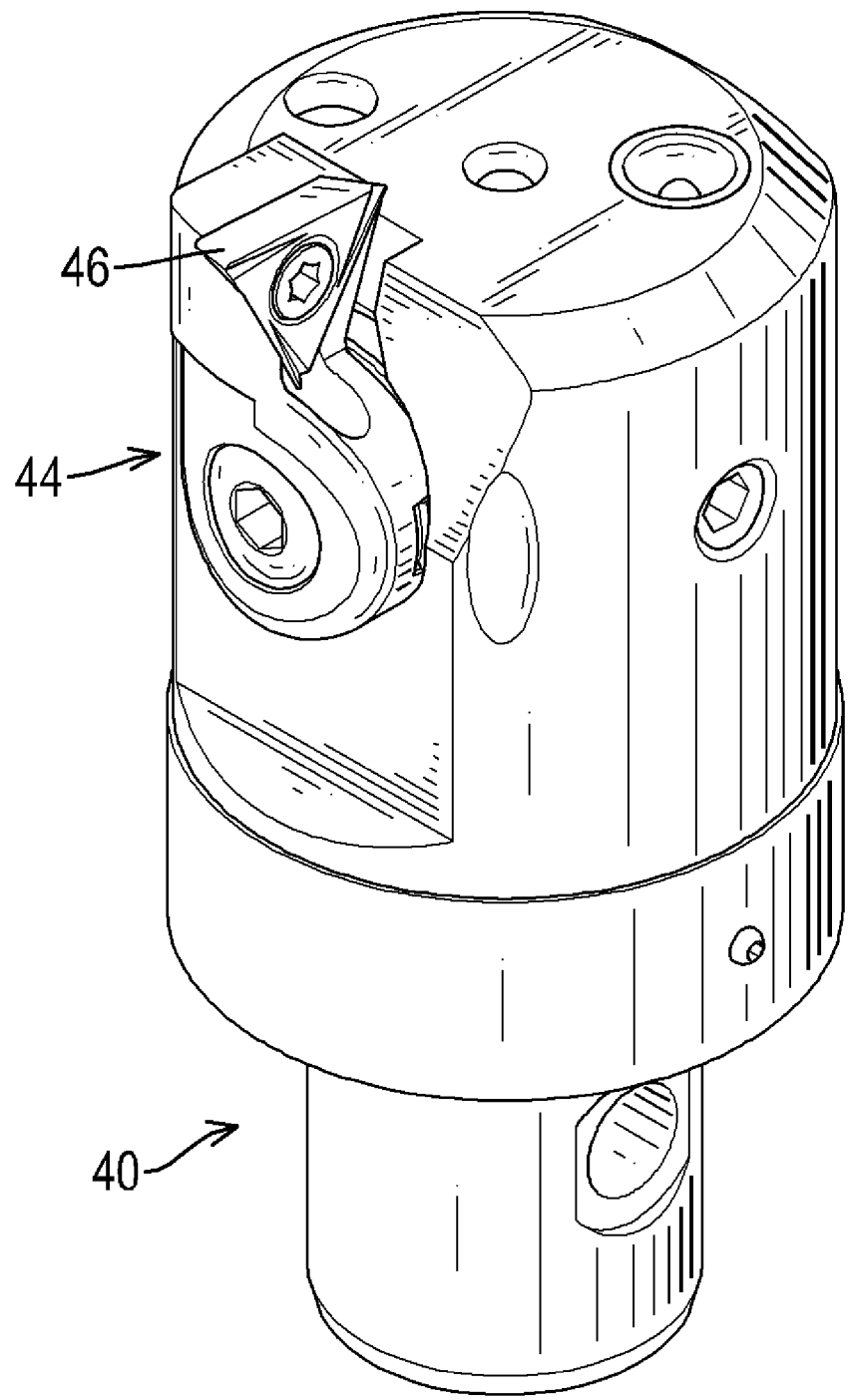
FIG. 6 is an exploded perspective view of the boring bit in FIG. 5.

With reference to FIGS. 2 to 4, when assembling the boring bit, the blade (30) is fastened securely on the top of the blade assembly (20), mounting the mounting base (21) of the blade assembly (20) in the mounting recess (14) of the head (10) to mount the guiding channel (23) of the mounting base (21) around the holding protrusions (17) of the head (10) and then the fastener (24) is mounted in the through hole (22) of the mounting base (21) to screw with the threaded hole (16) of the head (10). When the fastener (24) is screwed securely with the threaded hole (16) of the head (10), the abutting faces (231) of the guiding channel (23) will abut closely with the oblique restricting surfaces (171) of the holding protrusions (17) and the inner surface of the mounting base (21) will abut closely with the vertical restricting surface (15) of the head (10) and this will increase the contacting area between the holding protrusions (17) of the head (10) and the guiding channel (23) of the blade assembly (20). Then, the blade (30) will be securely and stably mounted on the boring bit so the boring bit in accordance with the present invention can withstand large loads.

With the arrangement of the holding screws (2114,2123), the blade assemblies (21) are securely mounted respectively on the holding portions (131) on the head (10). Because the bottoms of the holding block (212) abut with the top of the holding portions (131) and the engaging sides (2111) and bottoms of the blade assemblies (21) abut respectively with the abutting side (1312) of the holding portions (131) and the top surface of the base, the contacting area between the blade assemblies (21) and the external surface is enlarged. Thus, the boring bit has improved sturdiness and the boring bit is durable and has prolonged use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A boring bit having
    a head having
        a bottom;
        a top;
        a mounting recess formed on the head near the top and having
            a bottom;
            a vertical restricting surface formed on the bottom of the mounting recess and having a center; and
            a threaded hole formed through the center of the vertical restricting surface; and
        two holding protrusions formed on and protruding from the vertical restricting surface of the mounting recess beside the threaded hole and each holding protrusion having
            an upper edge;
            a lower edge; and
            two oblique restricting faces respectively and aslant formed on the upper edge and the lower edge of the holding protrusion;
    a blade assembly detachably attached to the head and having
        a bottom;
        a top;
        a mounting base formed on the bottom of the blade assembly, detachably mounted in the mounting recess of the head and having
            an inner surface being a flat surface, mounted in the mounting recess of the head and abutting with the vertical restricting surface of the mounting recess;
            a through hole formed through the mounting base and aligning with the threaded hole of the mounting recess; and
            a guiding channel laterally formed in the inner surface of the mounting base, communicating with the through hole of the mounting base and mounted around the holding protrusions of the head and having
                a top inner side;
                a bottom inner side; and
                two abutting surfaces respectively and aslant formed on the inner sides of the guiding channel and respectively abutting with the oblique restricting faces of the holding protrusions; and
        a fastener mounted in the through hole of the mounting base and screwed with the threaded hole of the mounting recess to connect the blade assembly with the head; and
    a blade detachably mounted on the top of the blade assembly.

2. The boring bit as claimed in claim 1, wherein the head has
    a connecting stub formed on the bottom of the head and having a top; and
    an external surface having a mounting segment formed on the external surface;
    wherein the mounting recess is formed on the mounting segment of the external surface.

3. The boring bit as claimed in claim 2, wherein
    the mounting recess of the head is circular; and
    the mounting base of the blade assembly has a shape corresponding to the mounting recess of the head.

4. The boring bit as claimed in claim 1, wherein
    the mounting recess of the head is circular; and
    the mounting base of the blade assembly has a shape corresponding to the mounting recess of the head.

* * * * *